United States Patent
Staerzl

[11] Patent Number: 5,804,712
[45] Date of Patent: Sep. 8, 1998

[54] OIL FLOW SENSOR

[75] Inventor: Richard E. Staerzl, Fond du Lac, Wis.

[73] Assignee: Brunswick Corporation, Lake Forest, Ill.

[21] Appl. No.: 722,611

[22] Filed: Sep. 27, 1996

[51] Int. Cl.⁶ .................................................. G01M 15/00
[52] U.S. Cl. ..................... 73/117.2; 73/117.3; 73/204.19; 73/204.23; 123/196 AB; 123/196 S
[58] Field of Search ................................... 73/116, 117.2, 73/117.3, 204.19, 204.23, 861.02, 861.03; 123/196 AB, 196 S; 392/480, 481, 485

[56] References Cited

U.S. PATENT DOCUMENTS

| | | | |
|---|---|---|---|
| 4,388,003 | 6/1983 | Feller | 73/861.03 |
| 4,445,470 | 5/1984 | Chmieleski . | |
| 4,478,076 | 10/1984 | Bohrer | 73/204.19 |
| 4,537,068 | 8/1985 | Wrobel et al. | 73/861.02 |
| 4,693,115 | 9/1987 | Tokura et al. | 73/204.19 |
| 4,725,713 | 2/1988 | Lehrke | 392/480 |
| 4,736,302 | 4/1988 | Kinugawa et al. | 73/204.19 |
| 4,815,431 | 3/1989 | Yorita et al. | 123/196 AB |
| 5,035,514 | 7/1991 | Newman | 73/204.19 |
| 5,216,918 | 6/1993 | Landis et al. | 73/204.19 |
| 5,339,687 | 8/1994 | Gimson et al. | 73/204.19 |
| 5,392,646 | 2/1995 | Yajima | 73/204.19 |

*Primary Examiner*—George M. Dombroske
*Assistant Examiner*—Eric S. McCall
*Attorney, Agent, or Firm*—Andrus, Sceales, Starke & Sawall

[57] ABSTRACT

An oil flow sensor and circuit to indicate the presence of oil flow in a multi-cylinder internal combustion engine. The oil sensor includes a heating element positioned within the oil line directly in the oil flow path. Positioned upstream and downstream from the heating element are an upstream heat sensor and a downstream heat sensor. Each of the heat sensors is a negative temperature coefficient resistive device, such that the resistance of the heat sensor varies depending upon oil temperature at the sensor. The output of both the upstream and downstream sensor is coupled to a comparator. The comparator compares the value of the signals from the heat sensors and triggers a switching circuit when the temperature at the sensors approach one another, thus detecting that there is not adequate oil flow to the engine. The switching circuit is connected to a signaling device that indicates whether oil flow to the engine is adequate.

9 Claims, 2 Drawing Sheets

OIL FLOW SENSOR

FIELD OF THE INVENTION

The present invention relates to the lubricating system for an internal combustion engine. More specifically, the invention relates to an oil flow sensor for a two-cycle internal combustion marine engine.

BACKGROUND OF THE INVENTION

In many current two-cycle engines, the flow of oil through the engine is typically sensed by monitoring the operation of the oil pump. This type of sensing indicates whether or not the oil pump is actually running, but does not detect oil flow directly, and is therefore susceptible to providing false indication that oil is moving through the lubricating system when oil is not moving through the lubricating system. In these systems, as long as the oil pump continues to operate, the oil flow sensor is satisfied, even if the oil line is blocked, the system is completely out of oil, or if the oil line is disconnected. Damage can and usually does occur to the engine under such circumstances because there is no indication that no oil is actually flowing through the system.

Directly measuring the flow of oil through the oil line to the engine with conventional measurement techniques (e.g., turbines, etc.) is not practical because oil flow to a two-cycle engine during normal operation is relatively minute. For example, at higher engine operating speeds, the flow of oil to the engine is approximately 1 gallon of oil to every 100 gallons of gas. This ratio breaks down to approximately 1 drop of oil being moved through the system every 5 seconds. This extremely low oil flow is difficult to measure using standard flow devices such as turbines positioned within the oil flow.

It can be appreciated that an oil flow sensor that directly senses the minute amount of oil flow in two-cycle internal combustion engines is desirable.

SUMMARY OF THE INVENTION

The invention solves the above-identified problems by providing a practical oil sensing system that directly detects oil flow in an internal combustion engine. The invention includes a heating element that is positioned directly within the oil flow in the oil line. Positioned on both the upstream and downstream side of the heating element are a pair of heat sensors. The invention detects whether oil is flowing through the oil line based on temperature signals from the heat sensors.

More specifically, the heating element is activated with the heating element and the upstream and downstream heat sensors positioned within the oil flow. As the heat generated by the heating element increases, both the upstream and downstream heat sensors generate respective temperature signals corresponding to the temperature of the oil at each of the sensors. In accordance with the invention, means for comparing the temperature signals and generating a flow indicator signal are provided. Preferably, both the upstream and downstream heat sensors are coupled to a comparator or some other device that can compare the two electric signals. The first input of the comparator is coupled to the upstream heat sensor, while the second input of the comparator is coupled to the downstream heat sensor. The comparator preferably receives signals related to the first and the second temperature signals (or signals derived therefrom). The comparator generates a flow indicator signal based on the difference between the first temperature signal and the second temperature signal which identifies whether oil flow is adequate.

If oil is flowing through the system as desired, the temperature signal from the downstream heat sensor should be different than the temperature signal from the upstream sensor. This is because the oil is heated as the oil flows over the heating element positioned between the two heat sensors. If little or no oil is flowing past the heating element, the temperature signals from the upstream and downstream heat sensors should be substantially equal, and a flow indicator signal indicating inadequate flow will be generated.

In the preferred embodiment of the invention, the heating element is a positive temperature coefficient device while both the upstream and downstream heat sensors are negative temperature coefficient devices. These devices are reliable, yet relatively inexpensive.

The oil flow sensor of the invention directly detects whether oil is flowing through the oil line of an internal combustion engine in a reliable manner, while being both practical and inexpensive.

DETAILED DESCRIPTION OF THE DRAWINGS

Figure 1:
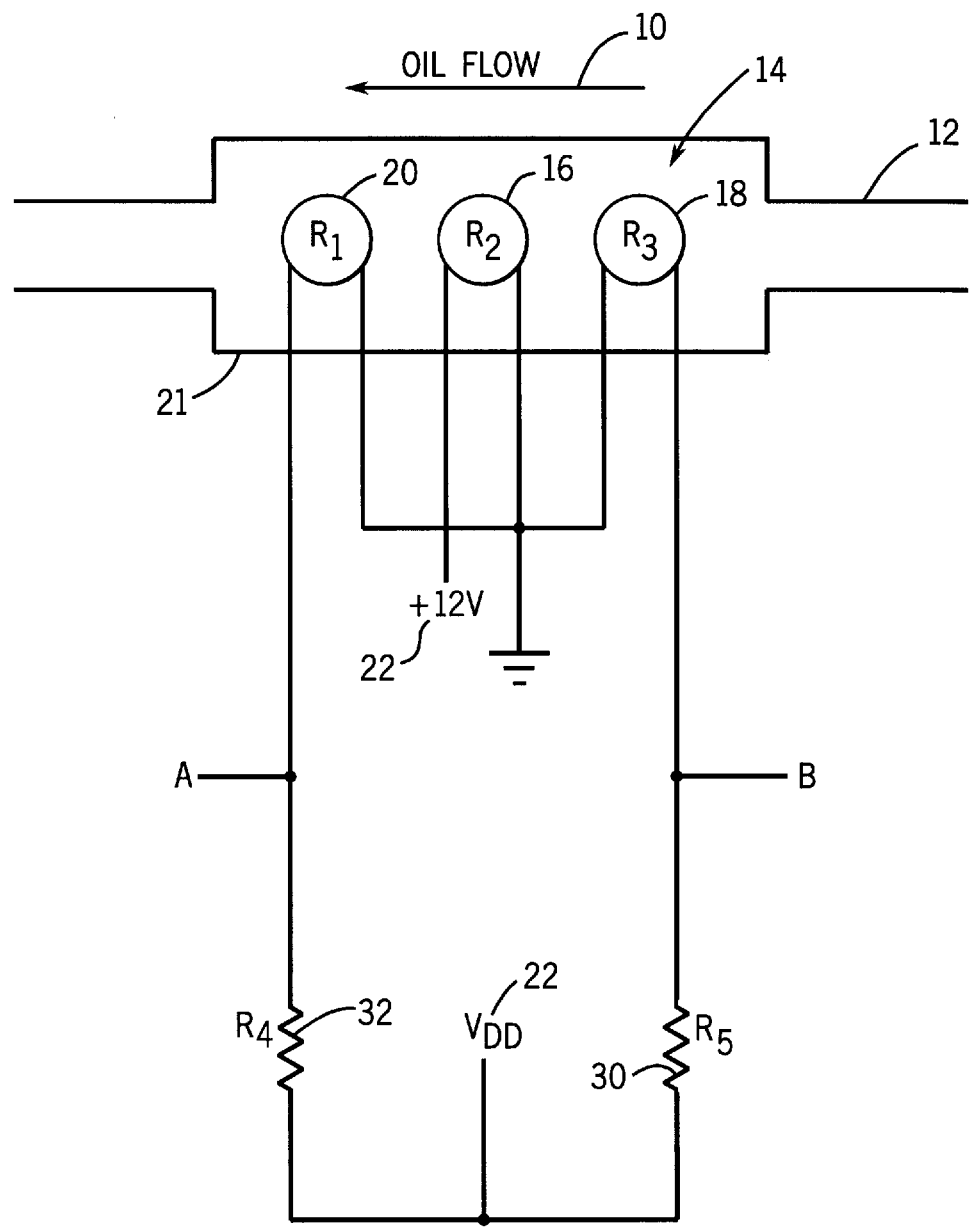
FIG. 1 is a schematic diagram of the invention showing the positioning of the heating element and the upstream and downstream sensors within an oil flow path.

Referring first to FIG. 1, thereshown is the general flow of oil 10 through an oil line 12 for a multi-cylinder, two-cycle internal combustion engine (not shown). An oil sensor in accordance with the present invention is shown positioned in the oil line 12 and is generally designated by reference numeral 14. The oil flow sensor 14 consists of a heating element (R2) 16, an upstream heat sensor (R3) 18, and a downstream heat sensor (R1) 20. The oil flow sensor 14 is positioned within a housing 21 that is inserted in the oil line 12. Preferably, the housing 21 is positioned within the oil line 12 near the outlet of the oil pump.

In the preferred embodiment of the invention, the heating element 16 is a positive temperature coefficient resistive device. A suitable heating element can be can be purchased from Keystone, Model RL3005-10-110-12PTF. One lead of the heating element 16 is connected to a positive supply of voltage 22, such as 12 volts DC, while the other lead is connected to ground. When voltage 22 is first applied to the preferred heating element 16, current passes through the heating element 16 and heats the heating element 16 so that the resistance of the heating element 16 increases. The resistance of the heating element 16 continues to rise until the heating element 16 reaches the rated operating resistance and current. As current continues to pass through the heating element 16, the heating element 16 generates heat at a constant temperature. By using a positive temperature coefficient resistive device as the heating element 16, the heating element 16 not only maintains a constant heating temperature, but also operates efficiently. In the preferred embodiment, the heating element 16 draws less than 1 amp of current from the voltage supply 22.

An upstream heat sensor 18 is positioned in the oil sensor 14 upstream of the heating element 16. A downstream heat sensor 20 is positioned in the oil sensor 14 downstream of the heating element 16. Both the upstream heat sensor 18 and the downstream heat sensor 20 are preferably negative temperature coefficient resistive devices. Therefore, as the temperature of the oil surrounding either of the sensors 18 or 20 increases, the resistance of the sensor decreases. It is preferred that the upstream heat sensor 18 be identical to the downstream heat sensor 20. In the preferred embodiment, each of the heat sensors 18 and 20 are both 50 kΩ maximum devices sold by Keystone under Model No. 82-11856. As can be seen in FIG. 1, both of the sensors 18 and 20 are connected between ground and the positive supply of voltage 22 through one of a pair of resistors 30 and 32, thereby creating a pair of voltage dividers, the significance of which will be discussed in further detail below. In the preferred embodiment, each of the resistors 30 and 32 are 15 kΩ.

In operation, the oil flow sensor 14 works as follows. The heating element 16 and each of the heat sensors 18 and 20 are positioned within the oil line 12. Once positioned as such, supply voltage 22 is applied to the heating element 16 such that the heating element 16 transmits heat into the oil flow 10. If oil is flowing throughout the oil line 12, the temperature at the downstream heat sensor 20 will be greater than the temperature at the upstream heat sensor 18, since heat is convected downstream from heating element 16 by the oil flow 10. With an adequate amount of oil flow, the resistance of the downstream heat sensor 20 should be less than the resistance of the upstream heat sensor 18 (unless the sensors 18 and 20 are not properly matched). If, however, the flow of oil 10 through the oil line 12 has stopped, or is otherwise inadequate, the resistance of the upstream heat sensor 18 will be approximately equal to the resistance of the downstream sensor 20, because heat from the heat element 16 will transfer through the stagnant oil in the oil line 12 at essentially the same rate in both the upstream and downstream directions. Therefore, by comparing the resistance of the upstream sensor 18 to downstream sensors 20 (i.e. comparing the temperature at the upstream heat sensor 18 to the temperature at the downstream heat sensor 20), the oil sensor 14 determines whether an adequate amount of oil is flowing through the oil line 12.

Figure 2:
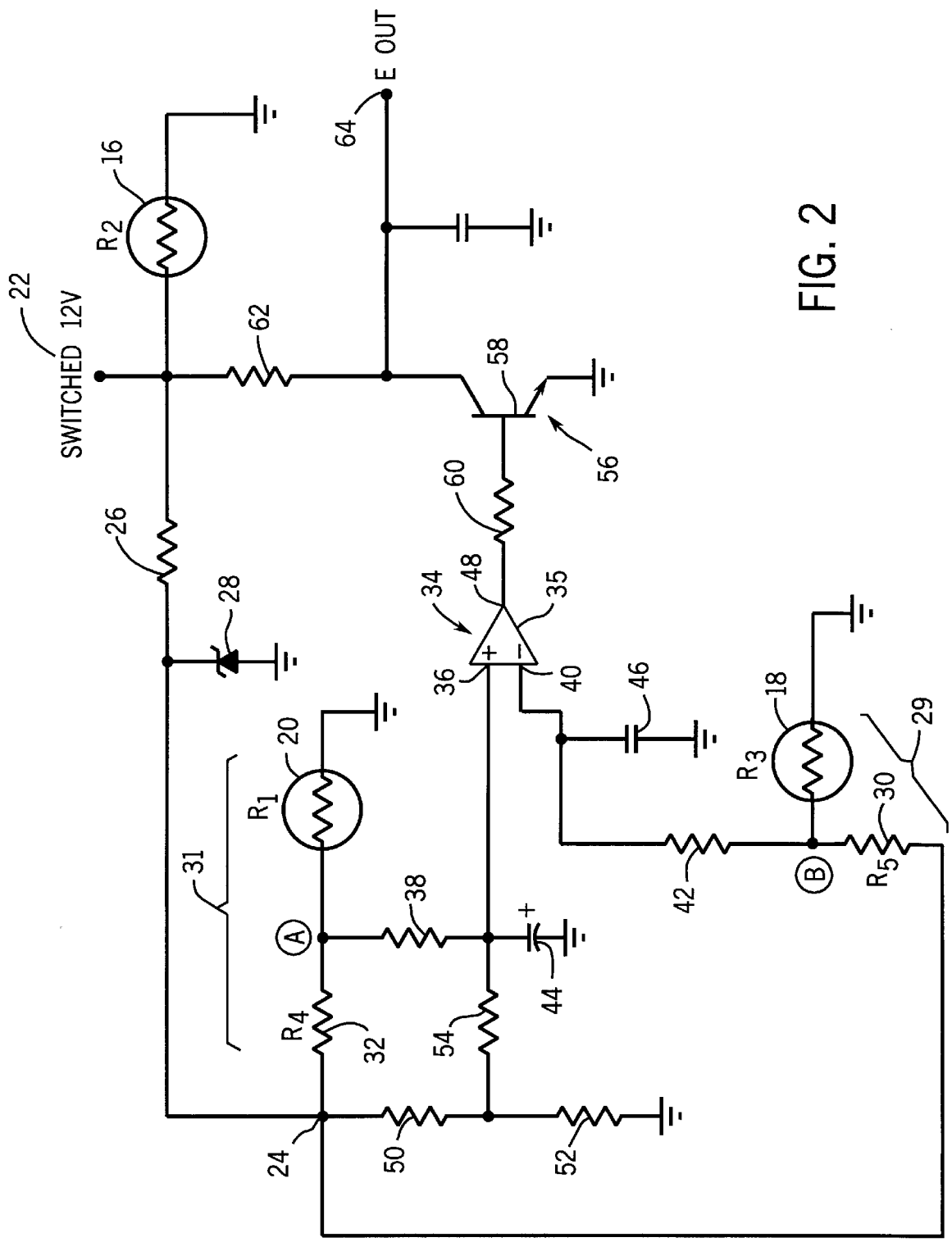
FIG. 2 is a circuit diagram of the preferred embodiment of the invention.

Referring now to FIG. 2, the heating element (R2)16, the downstream heat sensor (R1) 20 and the upstream heat sensor (R3) 18 are each represented by a resistor in the circuit diagram of FIG. 2. Each of these components 16,18, 20 is actually a temperature dependent variable resistor, as previously discussed with respect to FIG. 1. FIG. 2 is a detailed circuit diagram of the schematic diagram shown in FIG. 1 with like parts having corresponding reference numerals to facilitate understanding.

FIG. 2 shows a first voltage divider 29 between a common point 24 and ground which includes the upstream heat sensor 18; and a second voltage divider 31 between the common point 24 and ground which includes the downstream heat sensor 20. The common point 24 is connected to the power supply 22 through a voltage regulating circuit comprised of resistor 26 and zener diode 28. The combination of the resistor 26 and the zener diode 28 holds the common point 24 at a specific value determined by the zener diode 28. In the preferred embodiment of the invention, the zener diode 28 is an 8.2 volt diode such that the voltage at common point 24 is held at approximately 8.2 volts.

The first voltage divider 29 consists of resistor R5 30 and the upstream heat sensor 18. The first voltage divider 29 divides the voltage present at common point 24 among the resistor R5 30 and the upstream heat sensor 18, such that a first voltage appears at the connection (labeled B) between resistor R5 30 and the upstream heat sensor 18.

The second voltage divider 31 consists of resistor R4 32 and downstream heat sensor 20 connected between the common point 24 and ground. As with the first voltage divider 29, the second voltage divider 31 divides the voltage at common point 24 between resistor R4 32 and the downstream heat sensor 20, such that a second voltage appears at the connection (labeled A) between resistor R4 32 and downstream heat sensor 20. The voltages present at connections A and B vary depending upon the value of the resistance of the upstream heat sensor 18 and downstream heat sensor 20, respectively. Since both the upstream and downstream sensors 18,20 are negative temperature coefficient resistive devices, the resistance of the sensor decreases as the temperature at the sensor increases, thereby causing the voltage at connections A and B to drop respectively (i.e., as the oil temperature at the sensors 18,20 increases, the resistance of the sensors 18,20 decreases and the voltage at connections B,A in the voltage divider decrease in value). Likewise, if the temperature at the sensors 18,20 decreases, the voltage at connections B and A will increase, respectively.

In the preferred embodiment of the invention, resistors R4 and R5 30, 32 are matched 15 kΩ resistors, and the heat sensors 18 and 20 are also matched 50 kΩ devices. Therefore, if the temperature at the upstream heat sensor 18 is equal to the temperature at the downstream heat sensor 20, the voltage at point B will be equal to the voltage at point A plus or minus only tolerance variations. Likewise, if the temperature at the downstream heat sensor 20 is greater than the temperature at the upstream heat sensor 18, as is the case when oil flow 10 is adequate, the resistance of the downstream sensor 20 will be less than the resistance of the upstream sensor 18, and the voltage at point A will be less than the voltage at point B.

A comparator 34, such as but not limited to standard comparator 35 having Model No. LM324 in the preferred embodiment of the invention, is used to compare the voltage values at point A and point B. In referring to the comparator 34, it is understood that a variety of equivalent devices, such as a microprocessor, could replace the standard comparator 35 shown in the figures, as long as the equivalent device can compare two signals and generate an output based on the signal values. Point A is connected to the positive input terminal 36 of the comparator 34 through a resistor 38 to supply a temperature-related signal from the downstream sensor 20. Point B is connected to the negative terminal 40 of the comparator 34 through a resistor 42 to supply a temperature-related signal from the upstream sensor 18.

In the preferred embodiment of the invention, the resistors 38 and 42 are matched 200 kΩ resistors. Also connected to both the positive input terminal 36 and the negative input terminal 40 of the comparator 35 are a pair of capacitors 44 and 46. Capacitors 44 and 46 act to eliminate noise present at the inputs to the comparator 35. As can be understood by the circuit diagram of FIG. 2, when the voltage of the temperature signal at point A, coupled to the positive terminal 38, is greater than the voltage of the temperature signal at point B, coupled to the negative input terminal 40, the comparator 35 will output a flow indicator signal at its output terminal 48 equal to the voltage difference between the inputs.

During normal oil flow, the voltage at point A, which represents the temperature at the downstream sensor 20, should be less than the voltage point B, which represents the temperature at the downstream sensor 18. To prevent a flow indicator signal from being generated during proper oil flow, an offset voltage circuit consisting of resistors 50 and 52 is also connected to the positive input terminal 36 of the comparator 35. In this manner, a positive voltage is added to the voltage of the temperature signal at point A such that the sum is approximately equal to the voltage of the temperature signal at point B. The amount of offset voltage can be varied depending upon the optimal amount of oil flow through the oil line 12. If the amount of oil flow through the line 12 is normally very small, the amount of offset voltage would also be small since the resistance of the upstream heat sensor 18 and the resistance of the downstream heat sensor 20 will be very nearly the same due to the low rate of oil flow.

If the oil flow 10 through the oil line 12 stops, the temperature of upstream sensor 18 will increase, thus resulting in a decrease in the resistance of upstream sensor 18, causing the voltage at point B to decrease. Therefore, the difference between the voltages at the positive and negative inputs of the comparator 35 will increase, causing an increase in the flow indicator signal at output 48.

Connected to the output 48 of the comparator 35 is a switching circuit generally designated by the reference numeral 56. In the preferred embodiment of the invention, the switching device 56 is a transistor 58, although other devices such as a relay or another type of electrically operated switch could be used. The base of transistor 58 is connected to the output 48 of the comparator 35 through a resistor 60. The emitter of transistor 58 is connected to ground, while the collector is connected through resistor 62 to the power supply 22. In operation, if the flow of oil 10 through the oil line 12 is too low, the temperature at the upstream heat sensor 18 will increase, causing the voltage at the negative input terminal 40 to decrease. Therefore, the difference between the voltage at the negative input terminal 40 and the combined voltage at the positive input terminal 36 will increase, causing the comparator 35 to output a flow indicator signal to the base of transistor 58. When the flow indicator signal reaches a set value, the flow indicator signal will turn on the transistor 58 causing a signal to appear at the output terminal 64 of the oil sensor 14. This output terminal 64 can be connected to any one of a variety of signaling means, such as an LED or audio signal generating device, such that when the oil flow 10 falls below a selected value, the oil sensor 10 will trigger a signal means indicating a problem exists.

In this manner, the oil flow sensor 14 of the present invention operates to directly indicate a flow of oil through an oil line 12 in an internal combustion engine.

While the invention has been described as having positive and negative temperature coefficient devices labeled in specific positions, it is understood that the positive devices could be interchanged with negative devices with only slight modifications being required to the circuitry of the invention. An embodiment having only positive temperature coefficient devices is also contemplated as being within the scope of the present invention.

It is thought that the present invention and its advantages will be understood from the foregoing description. The form of the invention described above is merely a preferred or exemplary embodiment of the invention. It will be apparent that various changes can be made without departing from the spirit or scope of the invention.

I claim:

1. An oil flow sensor for an internal combustion engine having an oil line, the oil flow sensor comprising:
   a heating element positioned within the oil line;
   a first heat sensor positioned in the oil line downstream from the heating element for generating a first temperature signal;
   an offset circuit for generating an offset signal that is combined with the first temperature signal;
   a second heat sensor positioned in the oil line upstream from the heating element for generating a second temperature signal;
   a comparator having a first input that is coupled to the first heat sensor and the offset circuit and a second input that is coupled to the second heat sensor, the comparator outputting a flow indicator signal based at least in part on the first temperature signal and the second temperature signal; and
   a switching device that receives the flow indicator signal from the output of the comparator and operates a signaling device in accordance with the flow indicator signal from the output of the comparator.

2. The oil flow sensor of claim 1 wherein the heating element is a positive temperature coefficient device.

3. The oil flow sensor of claim 1 wherein the first and second heat sensors are negative temperature coefficient devices.

4. The oil flow sensor of claim 1 wherein the first heat sensor forms part of a first voltage divider, and the second heat sensor forms part of a second voltage divider.

5. A method of determining whether an adequate amount of oil is flowing through an oil line in an internal combustion engine, the method comprising the steps of:
   positioning a heating element within the oil line;
   positioning a downstream heat sensor in the oil line downstream from the heating element;
   positioning an upstream heat sensor in the oil line upstream from the heating element;
   generating a first temperature signal corresponding to the temperature at the downstream heat sensor;
   generating a second temperature signal corresponding to the temperature at the upstream heat sensor;
   adding an offset signal to the first temperature signal such that the second temperature signal and the combination of the first temperature signal and the offset signal are approximately equal during normal oil flow;
   comparing the combination of the first temperature signal and the offset signal to the second temperature signal;
   generating an indicator signal based on the difference between the combination of the first temperature signal and the offset signal and the second temperature signal; and
   operating a switching device based upon a magnitude of the indicator signal.

6. The method of claim 5 wherein a first and second temperature related voltages are generated by dividing a common voltage between a resistor and the upstream and the downstream heat sensor such that the first and second temperature signals are converted into the first and second temperature-related voltages which are compared.

7. The method of claim 5 wherein the switching device is operated when the combination of the first temperature signal and the offset signal exceeds the second temperature signal, thereby indicating proper oil flow.

8. A method of determining oil flow in an internal combustion engine having an oil line, the method comprising the steps of:
   positioning a positive temperature coefficient resistive heating element within the oil line;
   positioning a negative temperature coefficient resistive heat sensor in the oil line downstream from the heating element;
   positioning a negative temperature coefficient resistive heat sensor in the oil line upstream from the heating element;

generating a first temperature signal corresponding to the temperature at the downstream heat sensor;

generating a second temperature signal corresponding to the temperature at the upstream heat sensor;

adding an offset signal to the first temperature signal;

comparing the combination of the first temperature signal and the offset signal to the second temperature signal;

generating an indicator signal when the combination of the first temperature signal and the offset signal exceeds the second temperature signal; and operating a switching device upon generation of the indicator signal to signal improper oil flow.

9. An oil flow sensor for an internal combustion engine, having an oil line, the oil flow sensor comprising:

heating means for heating oil flowing through an oil line;

first heat sensing means for measuring the temperature of oil flowing through the oil line downstream of said heating means and generating a first temperature signal in response thereto;

second heat sensing means for measuring the temperature of oil flowing through the oil line upstream of said heating means and generating a second temperature signal in response thereto;

an offset circuit for generating an offset signal that is combined with the first temperature signal, the offset signal having a magnitude such that the combination of the first temperature signal and the offset signal is approximately equal to the second temperature signal during normal oil flow; and comparing means for receiving and comparing the combination of the first temperature signal and the offset signal to the second temperature signal, the comparing means outputting a flow indicator signal when the combination of the first temperature signal and the offset signal exceeds the second temperature signal.

* * * * *